Patented June 8, 1926.

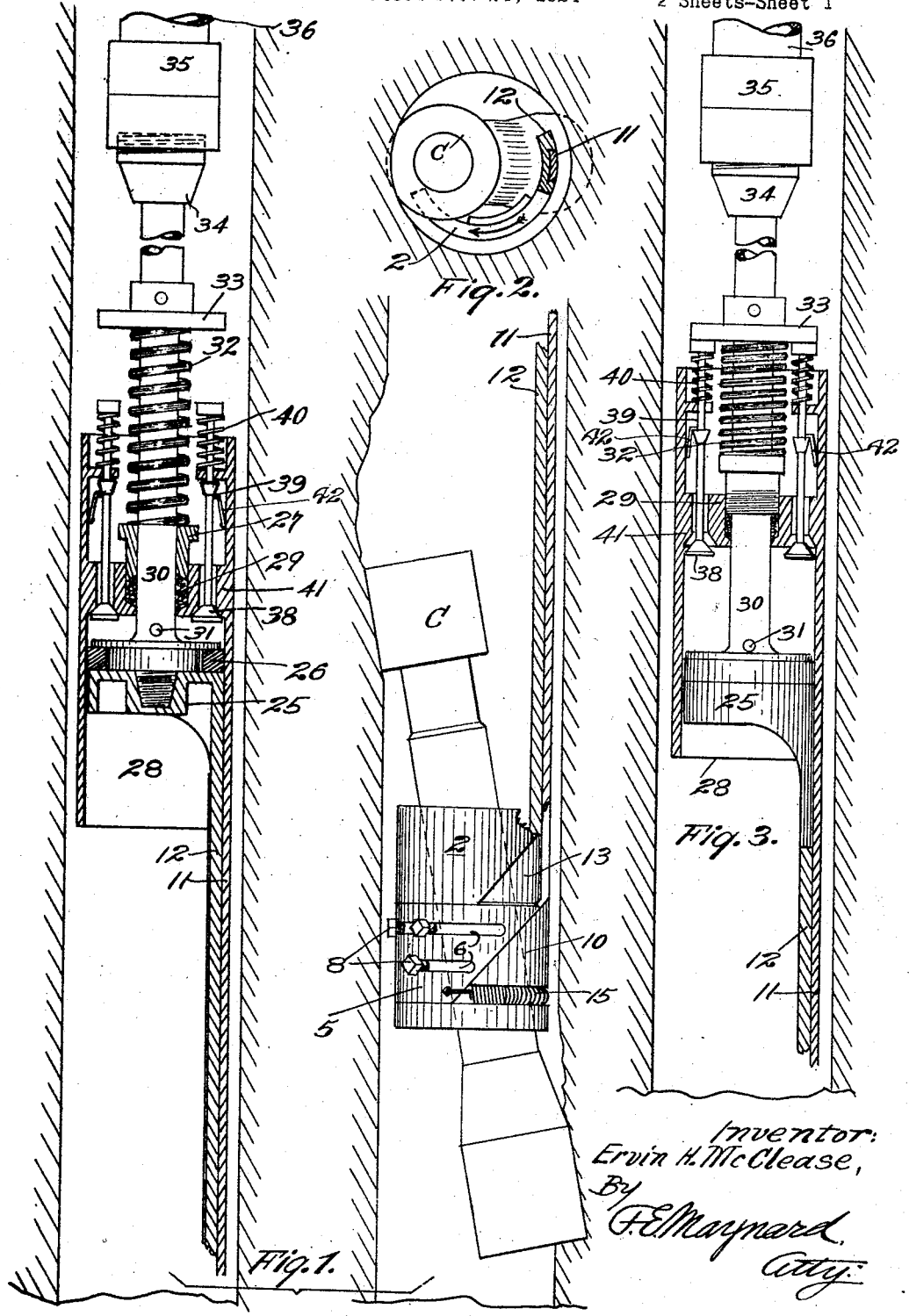

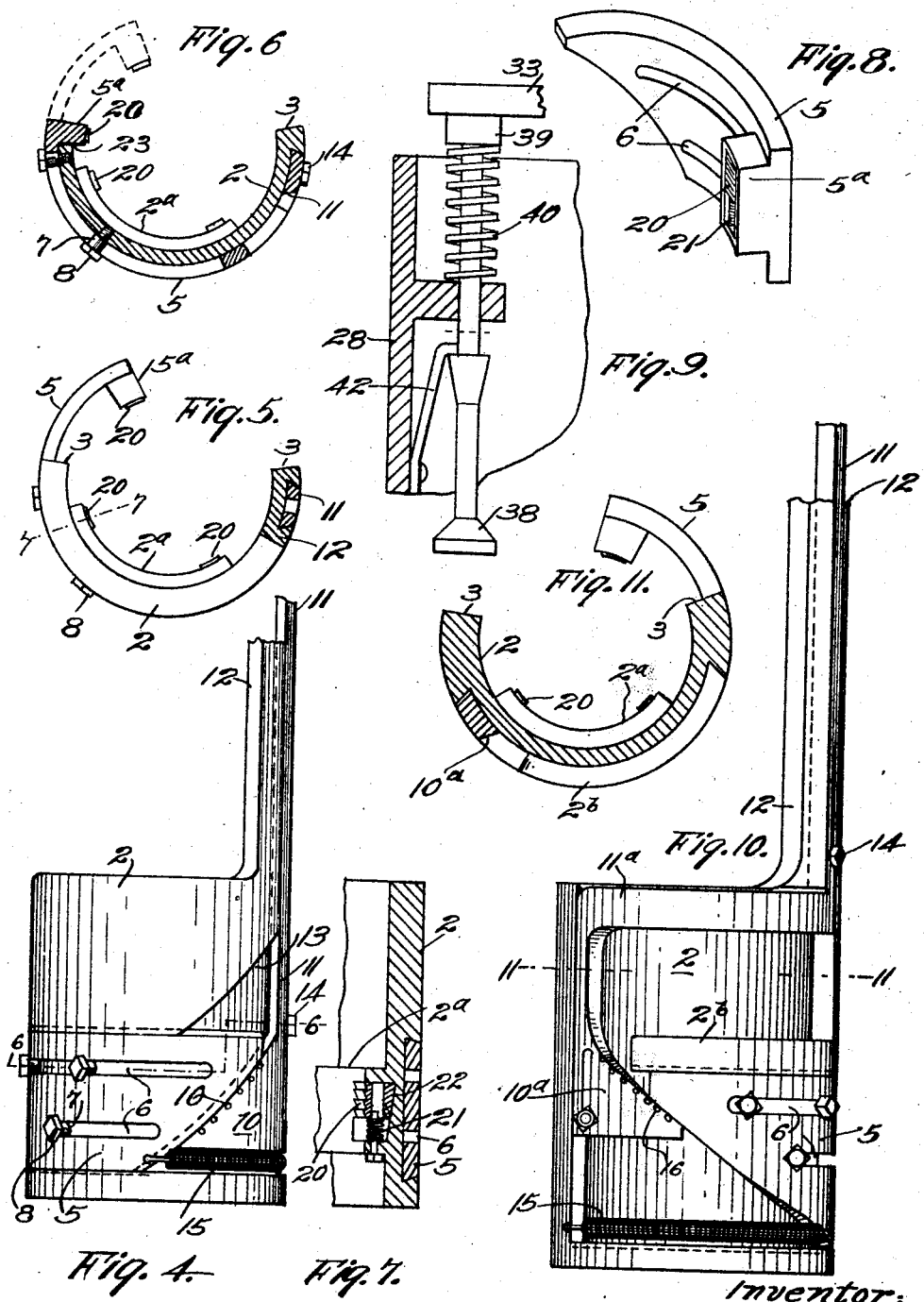

1,587,971

UNITED STATES PATENT OFFICE.

ERVIN H. McCLEASE, OF LONG BEACH, CALIFORNIA.

SIDE-HOOK FISHING TOOL.

Application filed December 24, 1924. Serial No. 757,909.

This invention relates to deep well "fishing" tools. A most difficult, expensive and time-taking process becomes necessary when parts of deep well apparatus and foreign objects fall into a well hole and to perform the task of recovering or removing the object in the hole a great variety of tools and apparatus have been devised with more or less satisfactory results when used. However, in many fishing jobs the fish is not only never recovered, removed or dislodged, but the well is often abandoned at a loss of many thousands of dollars. This is very unfortunate, especially in proven territory where it is known that the hole would produce when completed.

Every fishing job differs from any other, and in naked holes an especially difficult problem is presented because of geological structure, nature of material and the character of fish in the hole.

Many fish are caught by overshot tools and others by spears, but some jobs cannot be successfully completed with either, and the hole is lost or side-tracked around the fish.

The broad object of my present invention is to provide a tool which will successfully grapple fish that cannot be taken by overshot or spear tools.

An object is to provide a tool which may be successfully placed at the fish to be drawn and then so actuated as to embrace the fish and enable its being pulled from the hole.

An object is to provide a hooking tool which can pass around a side of a fish the top of which cannot be successfully secured by other types of tools because of condition or position of fish.

An object is to provide a hooking tool to be set with a turning action about the fish, and having a prehensile device to complete the encircling embrace to insure the catch.

Further objects and advantages will be made manifest in the following specification of embodiments of apparatus of the invention illustrated in the accompanying drawing; it being understood that modifications, variations, and adaptations may be resorted to within the scope of the invention and the spirit thereof as here claimed.

Fig. 1 is an elevation and section showing the tool in retracted, lowering condition in a naked hole and side hooking a lost drill collar.

Fig. 2 is a plan and cross-section of the tool being hooked around the fish.

Fig. 3 is an elevation and section showing the hydraulic head of the tool in jaw closing position of the head.

Fig. 4 is a detail view of the retracted hook.

Fig. 5 is a plan and section showing the projected hook.

Fig. 6 is a section on 6—6 of Fig. 4, showing retracted hook.

Fig. 7 is a section on line 7—7 of Fig. 5.

Fig. 8 is a perspective of the detached hook.

Fig. 9 illustrates a latched valve of the hydraulic head.

Fig. 10 is an elevation of a modified form of hooking mechanism.

Fig. 11 is a section on line 11—11 of Fig. 10.

The present invention resides more particularly in the structure of a side-hook fishing tool embodying a prehensile hook element adapted to be extended from a retracted position after the tool has been set in position about a fish to be taken out of a well hole.

The operating parts of the tool may be actuated by various means under control of the operator at the head of the well but I prefer to utilize a hydraulic apparatus and employ a drill pipe as a conduit for fluid as well as using it as a suspending and elevating means for inserting and pulling the tool.

An extended description of a form of hydraulic apparatus will be found in my application filed Nov. 6, 1924,—S. N. 748,132 and the mode of its use.

The fishing tool of the present invention embodies a segment of a cylinder 2 of suitable thickness and of a diameter determined only by the size of the well hole or casing and the character of fish sought. The angular length of the segment 2 may vary so as to form a side mouth between its ends 3 of preferably less than 180° so that the segment can be set astride a fish as the lips of the wide mouth pass across or along the fish.

After the fish has been located the segment is rotated on its own axis as indicated in Fig. 2 to pass about the fish which is shown in Figs. 1 and 2 as a lost drill collar C, tilted across a naked hole in such manner that it cannot be speared or overshot by a tool.

There is mounted in the segment 2 a sliding segmental hook 5 fitted in ways in the body 2 and being slotted at 6 to bear on antifriction rollers 7 on pins or screws 8. The front, effective end of the retracted hook may be flush with the near lip 3 of the body and its inner end is inclined helically to match with a cam heel 10 of the lower end of a leg 11 slidably guided and retained in a boot or stem 12 extending from the top end and one corner of the body 2 which is recessed at 13 to provide for the upward movement of cam 10. The leg 11 is slotted to receive retaining screws 14 at suitable points.

The hook member 5 may be provided with a contractile spring 15 drawing it back against the face of the cam heel 10 which may be provided with antifriction rollers 16, Fig. 4.

It will be seen that if the cam heel 10 is moved relative to the body 2, the hook 5 will be thrust outwardly from the lip 3 with a circular action about the center of the body 2 and so will move across the open mouth between the opposite lips 3, as shown in Fig. 5. This will effectually encompass the located fish by the parts 2 and 5 of the tool so that if the tool be now elevated, the grappled fish will be pulled from the hole.

To insure effective grappling of a fish the body 2 may have interior shoulder means $2^a$ and toothed, slip jaws 20 which may be yieldingly supported on springs 21 and bearing on inclined back walls 22 tending to thrust the jaws inwardly if, and as, they press down when brought up against the surface of a fish to be pulled out.

The outer nose of the curved hook 5 is shown as provided with a shoulder $5^a$ in which is provided a slip jaw 20. The shoulder $5^a$ may recede into a recess 23 therefor in the near lip 3.

When a fish having a collar or shoulder is taken it will rest on the shoulders $2^a$—$5^a$. If the fish has no shoulder, the slip jaws 20 will bite into its smooth surface.

Effective movement of the heel 10 to set the hook 5 may be accomplished in divers manners. As here shown the shank or boot 12 has a piston head 25 coaxial with the body 2 and having a packing 26 tightly fitting and working in a cylinder 28 which is attached to the upper end of the leg 11 lying in the boot 12.

The piston head 25 is attached to the lower end of the tubular stem 30 having ports 31 opening below the cylinder head 29 and above piston 25. The head 29 has a gland 27 on which seats one end of a spring 32, while the opposite end bears against a contact flange 33 fixed on stem 30, which is shown as attached by a reducer 34 and joint 35 to a drill pipe 36 by which the tool device is carried and, when positioned at a fish in a hole, is rotated to bring the hook body 2 as far around about the fish as may be possible. The tool may be either for right or left hand apparatus or operations.

The function of the spring 32 is to thrust the cylinder and its associated parts down as to piston head 25 and so push down leg 11 and heel 10 and allow the hook 5 to stand retracted in its pocket in the body 2.

The tool is lowered into a hole, preferably full of liquid, until the body 2 engages the fish. It is then maneuvered until it is felt to pass about the sides of the fish. When this position is established, as certainly as may be, then pressure of liquid as from a pump (not shown) in turned into the drill pipe 36 and its pressure above piston 25 forces the cylinder 28 upwardly along piston head 25 and in so doing pulls up leg 11 and heel 10 and this thrusts out the hook 5 which moves across the mouth between lips 3—3.

When the cylinder has been pressed up to the proper degree for projecting the hook 5, further movement by pressure is stopped by opening of valves 38 in cylinder head 29, when their stems 39 abut the stationary flange 33 on the drill pipe part 30. Springs 40 tend to hold the valves to their seats 41 in head 29. When the valves are opened pressure of fluid in the cylinder is released and the pump is stopped or its discharge is diverted from the drill pipe line. The tool is then pulled with its fish resting within the body 2 and hook 5.

If the fish is missed the hydraulic pressure is released. The spring 32 then forces the cylinder 28, the leg 11 and the cam heel 10, to their lowermost position. The spring 32 is of sufficient strength to force the cylinder 28 down while pressure of head of liquid in the open well and open drill pipe about balance, and this will cause the cam heel 10 to fall back from its raised, effective position and allow the hook to retract, after which the pump is again thrown onto the drill line for repeat action until the fish is caught.

When a fish is caught, its load on the hook 5 will prevent its being retracted.

When repeat action is not desired, I provide means to lock the valves 38 open after the first lift of the cylinder 28. This means is shown in Fig. 9 as comprising a simple snap latch 42 arranged so as to engage a part of or on a stem 39 when the valve 38 thereof has been pushed off its seat in cylinder head 29.

So long as the valves are held open against the action of the liquid pressure in the drill pipe, the liquid can drain freely out of the pipe and into the hole, as it is elevated and the stands broken out of the line.

A slightly modified form of the cam leg 11 is shown in Figs. 10 and 11. In this form the leg has a lateral foot 11ª, lying around the upper part of the body 2 of the hook, and having a downwardly extending heel part 10ª engaging the hook 5, whose top edge runs under a track 2ᵇ. The hook 5 and cam heel 10, or 10ª, are sunk in and lie flush with the outer face of the carrying body of hook 2.

The cam heel 10 is stopped in its upper position by contact with the shoulder 13 formed on body 2 before bearing faces of hook 5 and cam heel 10 clear. This prevents the spring 15, from retracting hook 5, under cam heel 10, thus locking the tool from further action.

What is claimed is:

1. A fishing tool including an embracing wall hook body having a laterally slidable hook to be passed around a fish by a circumferential movement of the slidable hook.

2. A fishing tool including an embracing, wall hook body having a circumferentially telescopic hook to be passed around the body of a fish.

3. A fishing tool apparatus including a telescopic, embracing wall hook body, and means for circumferentially projecting a hook member from the body of the device to move around the under side of a tilted fish.

4. A fishing tool apparatus including a telescopic, embracing wall hook device including a body part and a circumferentially projectable hook member, and hydraulic means for projecting the said member.

5. A fishing tool apparatus including a hook body part, a hook member circumferentially telescopic in said part, means for retracting said member, and means for projecting the hook member.

6. A fishing tool including an open sided body part to pass along one side of a fish, and circumferentially prehensile means carried thereby to be projected transversely in further embracing position around the opposite side of the fish.

7. A fishing tool including a hooking body part to pass down along one side of an inclined or bent fish in a well and the head of which is out of line of the tool axis, and movable means carried by the hook part to grip the fish irrespective of the inclination or distortion of the upper end of the fish out of line of the tool, and being operative without bringing the end of the fish up into a gripping position.

8. A fishing tool including a shank-like part and a hooking body part laterally extended from the shank to be passed around a fish, and a laterally projectable hook member mounted in said body part.

9. A fishing tool including a shank part and hooking body part laterally extended from the shank to be passed around a fish, and a normally retracted, prehensile hook member adapted to be projected laterally from the body part to further embrace the fish.

10. A fishing tool having a shank part and a segment of a cylinder extended laterally from the lower end of the said shank to hook around a fish, and a prehensile segment secured for lateral extension from one end of the first mentioned segment; said segments forming an extensible wall hook to embrace a fish.

11. A fishing tool having a shank part with a segmental body at its lower end, a segmental hook member projectable endwise from said body to embrace a fish; and means mounted on said shank and body for projecting the hook member.

12. A fishing tool having a segmental body part to pass around a fish, a segmental hook member projectable end-wise from said body, and cam means for effecting projection of the hook member.

13. A fishing tool having a channelled shank with an off-set segment on its lower end, prehensile means in said segment to embrace a fish, and means in said shank for projecting the prehensile means.

14. A fishing tool including a channelled shank having a cylindrical segment on its lower portion, prehensile means in said segment to embrace a fish, and cam means having an operative part along the shank, to actuate the prehensile means.

15. A fishing tool including a segment of a cylinder, spring retracted, prehensile means to embrace a fish about which the segment is positioned, and means for projecting said means.

16. A fishing tool including laterally extensible segments to pass around a fish; the interior faces of segments having means for engaging and supporting an embraced fish.

17. A fishing tool including laterally extensible, concentric segments to pass around a fish and having shoulders on their interior faces to engage and support a fish.

18. A fishing tool including relatively extensible, concentric segments to pass around a fish and having slip jaws on their interior faces to grip the surface of an embraced fish.

19. A fishing tool comprising fish engaging means, and an hydraulic means for actuating said means and including a cylinder, a piston operative in the cylinder, means for supplying operative fluid pressure to the cylinder, valves for controlling flow from the cylinder chamber, and means for locking the valves open after the initial action to provide for flow of liquid through the cylinder chamber.

20. A fishing tool including a cylinder having a downwardly extending leg, a piston having a downwardly extending boot in which said leg is slidable and retained, and fish grappling means on the lower ends of the leg and boot and operative upon relative action of the cylinder and piston.

21. A fishing tool including a cylinder having a downwardly extending leg, a piston working in the cylinder and having a downwardly extending boot slidably guiding the leg, a side wall, segmental body on the lower end of the boot, a prehensile hook member in and concentric with the body, and means on the lower end of the leg for shifting the hook member in the body.

22. A fishing tool including a lowering means, engaging means for adjustment thereby to a position at one side of the fish sought and below its upper end; said engaging means including a prehensile device adapted to be circumferentially moved relative to the lowering means to position further around the body of the fish without further rotation of the lowering means.

23. A side hook fishing tool including a side hook portion to pass to one side of a fish and to a position below the top end thereof irrespective of whether the top end of the fish is free or is laterally lodged, slide means on said hook portion to be circumferentially shifted relative thereto to pass further around the fish and gripping means carried by said hook portion and said slidable means to grip the fish.

24. A fishing tool having on its lower end a side hook adapted for the fishing of a fish standing tilted or having a distorted upper end, said tool including carrying means to pass down to one side of the upper tilted or distorted end of the fish, and having means to be circumferentially projected as to the first named means to a further embracing position around the fish without rotating the tool, and gripping means on the hook of the tool to grip the fish without bringing its top into line.

ERVIN H. McCLEASE.